March 31, 1964    R. HAZELETT    3,126,647
EDUCATIONAL MATERIALS AND METHODS
Filed Oct. 26, 1959
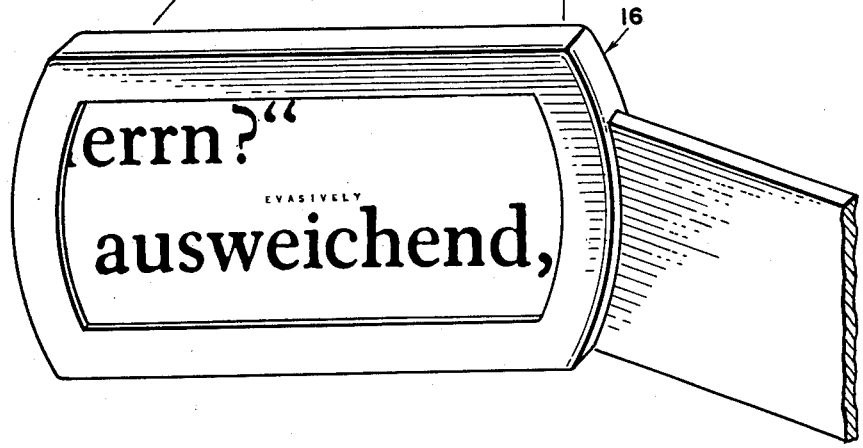
INVENTOR
Richard Hazelett
BY
Curtis, Morris + Safford
ATTORNEYS

United States Patent Office 3,126,647
Patented Mar. 31, 1964

3,126,647
EDUCATIONAL MATERIALS AND METHODS
Richard Hazelett, Malletts Bay, Winooski, Vt.
Filed Oct. 26, 1959, Ser. No. 848,599
9 Claims. (Cl. 35—35)

This invention relates to educational materials, arrangements, devices, etc., and to methods pertaining thereto. More in particular, this invention relates to printed material especially useful, for example, in teaching foreign languages and the like.

In learning a foreign language in the conventional manner, the student typically will be given reading assignments in a book containing a text printed in the foreign language. This text normally will be at a level of difficulty slightly higher than the student's capability, i.e. it will include some words or phrases unknown to the student. To assist the student in completing the translation of this text by himself, the book generally will include a vocabulary giving the meanings of many of the words appearing in the text.

To read an assigned text, the student often spends a large amount of time periodically thumbing through the vocabulary to look up the meanings of various words unknown to him. The time thus spent in vocabulary-thumbing is wasted, so far as learning of the foreign language is concerned. Moreover, the student's train of thought frequently is interrupted by this procedure, and his learning rate thus is apt to be decreased when he returns to the foreign language text. And, of course, vocabulary-thumbing is tedious work which tends to put the student in a frame of mind unreceptive to learning.

Accordingly, it is an object of this invention to provide means and methods for improving the teaching and learning of foreign languages and the like. It is a further object of this invention to provide foreign language text material which can be translated by a student without reference to a separate vocabulary. It is a still further object of this invention to provide novel means for increasing the rate of learning of foreign languages and the like, and for making the learning process more pleasant to the student.

Other objects, aspects and advantages of the invention will be in part pointed out in, and in part apparent from, the following description of a preferred embodiment of the invention considered together with the accompanying drawing which shows a printed page of foreign-language text made in accordance with this invention.

Referring now to the upper part of the drawing, there is shown a reproduction of a printed page 10 having text material 12 in the German language. (Note: This page from the novel Bekenntnisse des Hochstaplers Felix Krull was copyrighted in 1954 by Thomas Mann. It is reproduced by permission of Katharina Mann and the Houghton Mifflin Company.) Between the lines of German text 12 on this page is printed a number of very tiny English words 14, representing English translations of the German words immediately therebelow.

These English words 14 are printed in such small size as to be illegible, for all practical purposes, when viewed by the normal unaided eye at proper reading distance, i.e. about 18 inches. However, the English words are made fully legible by viewing the page through an ordinary hand magnifying glass 16, for example having a magnification power between 4× and 7×.

In using this form of printed material for learning, the student will, just as in the conventional learning process, read the foreign language text material 12 insofar as he is able. However, when he comes to a word that he is unable to translate from his own knowledge, instead of looking this word up in a vocabulary he will view the corresponding English word 14 immediately above the unknown word by means of the hand magnifying glass 16. Thus, the student will quickly be able to determine the meaning of the foreign word without having to thumb through a vocabulary. This provides a substantial saving in the student's time, as compared to the conventional process of learning, and makes it possible to give the student a larger reading assignment without any real additional burden. The student therefore will learn more in his available time, and the learning process will be considerably more pleasant.

The present invention is based on the principle of temporary concealment of the words of translation, in that these words are printed with such small size type that they cannot normally be read by the student without the use of the hand magnifying glass provided for this purpose. If these words of translation were sufficiently large to be read by the unaided eye, their presence would impede the learning process, because the student generally cannot resist the temptation to read the translation in his native tongue to the exclusion of the foreign language words he should be trying to learn. However, by making the words illegible without the aid of a magnifying glass, this temptation is effectively removed.

To assure that the words 14 of translation are properly concealed during study of the basic text, it has been found that these words advantageously should be .012″ in height, exclusive of ascenders or descenders (i.e. the vertical extensions of such letters as $b$ and $q$). When letters having ascenders or descenders are used, the total letter height may be about .024″. However, type having ascenders and descenders is slightly easier to read than plain type of the same basic size, because the ascenders and descenders provide a clue to the identification of the letter involved. For that reason, the temporary concealment of the tiny words is especially enhanced by using a plain type face (that is, a form of type having no ascenders or descenders) for printing these words. An example of a satisfactory plain type face is the plain copperplate gothic type shown in the drawing, wherein all of the letters are of the same height.

With further regard to the size of the tiny words 14, it is known that the human eye cannot resolve an angle of less than about 1/5700 radian under the best conditions and with the subject illuminated with white light. This limit is the result of fundamental physiological factors such as diffraction through the pupil, the size of the retina elements, etc. In order to identify one letter, the human eye must of course be able to resolve two or more points in the letter. Because of this, the human eye cannot identify a letter which subtends an angle of less than about 1/1800 radian to 1/2000 radian.

From this point of view, it has been determined that the tiny words 14 should be sufficiently small that they are absolutely illegible to the unaided human eye when viewed at a distance of 90 centimeters (35.5″). At this distance, a letter subtending an angle of 1/2000 radian will have a size of slightly under .018″. This sets an upper limit for the average height of the tiny words 14, exclusive of ascenders and descenders. Words having an average height greater than .018″ will be readily legible at the normal reading distance of about 18″, and thus will definitely be unsuited for the desired temporary concealment of the translation. The preferred size is, however, about .012″ in average height as mentioned hereinabove.

It will be evident, of course, that the temporarily-concealed tiny words can be used to provide a complete running translation of the foreign language text, rather than selected word translations as in the specific example given. In that case, the tiny words would not necessarily be next to the words they translate. Also, it is possible to use script type rather than printing type for the tiny words, if desired for special situations. Moreover, answers to mathematical problems and the like posed in the basic text can be temporarily concealed in this same manner, so that the student need not refer to answers provided in the back of the book. Other applications of this principle of temporary concealment will be apparent to those skilled in the art.

One specific method for producing a printed page having tiny interlinear words of translation will now be described. In this method, the first step is to prepare a conventional printed page or proof sheet, on which is printed from ordinary type or plates the foreign language text to be used as the reading assignment. Next, an enlarged photostatic positive (black on white) copy of this page is made, advantageously enlarged to about 2.5 times the size of the original page. This positive may be prepared, for example, in two stages, as by first making a negative photostatic copy that is twice as large as the original, and then forming from this negative a positive photostatic copy that is 1.25 times the size of the negative. With an overall enlargement of 2.5 to 1, a standard octavo-sized page can readily be placed on conventional 14" x 18" photostat paper.

The photostatic copy paper preferably is translucent material to which has been applied a photographic emulsion of high contrast and high density. Such a material is Kodalith Ortho-Thin Special No. 122 on Photostat spools, manufactured by the Eastman Kodak Company, Rochester, New York.

The words of translation then are placed directly on the enlarged positive photostatic copy of the page of text. In a preferred method of doing this, the words of translation first are formed on a photographic composing machine adapted to produce a series of black-letter words on a clear film base, the words being spread out to facilitate cutting. The size of these words may, for example, be about .028" high. This result can be obtained on the Intertype Fotosetter machine (Intertype Corporation, Brooklyn 2, New York) using their 6-point Gothic No. 31B and their reducing lens FS–809.

The photographically-composed words of translation are most expeditiously applied to the photostatic positive by using a rear-illuminated glass table such as a lithographer's layout table. A grid of thin graph paper is placed under the photostatic positive to aid in alignment of the words, which are cut apart and placed in position. Positioning is greatly expedited if the film containing the words of translation was previously coated wtih adherent wax on the back, following the procedure known in the art of photo-offset lithography. The words of translation are then more permanently affixed to the photostatic positive by means of photographically clear sticky-tape, used by those skilled in the art.

After applying the words 14 of translation to the photographic positive, the next step is to prepare lithographic plates from these positives. The lithographic plates are made with a reduction ratio of 2.5 to 1 in order that the final printed pages are the same size as the originals. The tiny words of translation, as described above, preferably will come out about .012" or slightly less in height. Such small-sized words, particularly when using a plain type face, are effectively illegible to a normal unaided eye at proper reading distance.

To assure optimum clarity of reproduction of the tiny words, special attention must be given during the production of the lithographic plates to the sharpness of focus of the camera used in this process, and specifically in preparing the negatives which constitute an intermediate step in their production. Moreover, these negatives should receive "still development," that is, with agitation ceasing after a few seconds, and in relatively de-aerated solution, as is known to those skilled in the art of producing line negatives. The lithographic plates should be non-grained or finely grained, to prevent blurring of detail. In presswork the quantity of ink applied to the paper must be relatively skimpy. Other precautions known to those skilled in the art of first-class photo-offset lithography must be followed.

The completed book is then distributed to the students for study. To use the book the student merely needs to obtain a small inexpensive hand magnifying glass having a magnification greater than about 2.5, for example a 4 power glass with a focal length of 63 mm. and a diameter of 27 mm. Many older people, or others with deficient vision, will prefer a glass of about 7 power, for instance of a focal length of 36 mm. and a diameter of 15 mm. Advantageously, the book may be provided with a small pocket glued inside the book cover and carrying a suitable magnifying glass.

It has been found that in many applications the words 14 of translation preferably are placed underneath the translated text words 12, rather than above the text words as shown in the drawing. A main reason for this is that frequently there is more usable space under text words than over them, since the alphabet of lower-case characters contains more ascending letters than descending letters. Thus it may never be necessary to provide special space for the words of translation such as by extra leading between lines of type.

Although a specific embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. Educational material for use in studying and learning foreign languages, mathematical propositions and the like, comprising a printed text consisting of a first series of symbols of one character, said first series of symbols having a height of between 5 and 18 points in printing measure and being fully legible to the normal unaided eye at proper reading distance, and a second series of symbols printed adjacent said first series of symbols, said second series of symbols being related to said first series of symbols in ideational content, said second series of symbols being so small as to be absolutely illegible to the unaided eye at a distance of 90 centimeters when printed on white paper and viewed in white light.

2. Educational material as claimed in claim 1, wherein the height of said second series of symbols is less than .024".

3. Educational material as claimed in claim 1, wherein the average height of said second series of symbols is less than .018".

4. Educational material for use in studying and learning foreign languages, mathematical propositions and the like, comprising a printed text consisting of a first series of symbols of one character, said first series of symbols having a height of between 5 and 18 points in printing measure and being fully legible to the normal unaided eye at proper reading distance, and a second series of symbols printed adjacent said first series of symbols, said second series of symbols being related to said first series of symbols in ideational content, said second series of symbols being no larger than .018" in average height exclusive of ascenders and descenders and effectively illegible to the normal unaided eye at proper reading distance.

5. Educational material for use in studying and learning foreign languages and the like, comprising a printed text consisting of a first series of words of one language, said first series of words having a height of between 5 and 18 points in printing measure and being fully legible to the normal unaided eye at proper reading distance, and a second series of words printed adjacent said first series of words, said second series of words being in a language different from said first series of words and providing a clarification of meaning of said first series of words, said second series of words being about .012" in average height exclusive of ascenders and descenders so as to be effectively illegible to the normal unaided eye at proper reading distance.

6. Educational material for use in studying and learning foreign languages and the like, comprising a printed text consisting of a first series of words of one language, said first series of words having a height of between 5 and 18 points in printing measure and being fully legible to the normal unaided eye at proper reading distance, and a second series of words printed adjacent said first series of words, said second series of words being in a language different from said first series of words and providing a clarification of meaning of said first series of words, said second series of words being printed in plain face type and having a height no greater than .018" so as to be effectively illegible to the normal unaided eye at proper reading distance.

7. The method of learning foreign languages or mathematical propositions and the like by studying a printed text presenting the material to be learned in symbolic characters of normal-sized printing together with interpretative indicia adjacent said material to be learned, said indicia being presented in printing sufficiently small in size that it is effectively illegible to the normal unaided eye at proper reading distance, said method comprising the steps of reading the normal-sized printing of said text until a portion of said text is reached that is not understood and thus needs clarification in order to continue the learning process, positioning an optical magnifying instrument over the region adjacent said text portion that includes the interpretative indicia pertaining thereto, and viewing said interpretative indicia through said magnifying instrument to obtain a clarification and understanding of the associated normal-sized text material.

8. The method of learning foreign languages and the like by studying a printed text presenting the foreign-language material to be learned in characters of normal-sized printing together with translation words adjacent said material to be learned, said translation words being presented in printing no larger than .018" in average height exclusive of ascenders or descenders so that they are effectively illegible to the normal unaided eye at proper reading distance, said method comprising the steps of reading the normal-sized foreign language printing of said text until a portion thereof is reached that is not understood by the reader and thus needs clarification in order to continue the learning process, positioning an optical magnifying instrument over the region adjacent said text portion that includes the translation words pertaining thereto, and viewing said translation words through said magnifying instrument to obtain a clarification and understanding of the associated foreign-language text material.

9. The method of learning foreign languages by studying a printed text presenting the foreign-language material to be learned in a plurality of lines of normal-sized printing together with translation words between said lines, each of said words being closely adjacent the corresponding part of said foreign-language material, said translation words being presented in printing no larger than .018" in average height so that they are effectively illegible to the normal unaided eye at proper reading distance, said method comprising the steps of: reading the foreign-language printing of said text until a portion is reached that is not understood and thus needs clarification in order to continue the learning process, positioning an optical magnifying instrument over the region adjacent said text portion that includes a translation word pertaining thereto, said magnifying instrument having a magnification power of at least 2.5, and viewing said translation word through said magnifying instrument to obtain a clarification and understanding of the associated foreign-language text material.

References Cited in the file of this patent

UNITED STATES PATENTS

| | | |
|---|---|---|
| 2,141,577 | Watson et al. | Dec. 27, 1938 |
| 2,204,931 | Gonzalez | June 18, 1940 |
| 2,279,949 | McCrum | Apr. 14, 1942 |
| 2,319,436 | Bailie | May 18, 1943 |
| 2,752,245 | Hough et al. | June 26, 1956 |
| 2,840,926 | Campbell | July 1, 1958 |

FOREIGN PATENTS

| | | |
|---|---|---|
| 995,470 | France | Aug. 22, 1951 |